United States Patent
McMenamy et al.

(10) Patent No.: US 9,178,742 B2
(45) Date of Patent: Nov. 3, 2015

(54) SYSTEM AND METHOD FOR MAINTAINING A PROVISIONED CONFIGURATION FOR AN ENDPOINT IN A COMMUNICATIONS NETWORK

(75) Inventors: Kevin Roy McMenamy, Fremont, CA (US); Graham Geoffrey Gudgin, San Jose, CA (US); Vivek Bhargava, Chapel Hill, NC (US); Paul Edwin Jones, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 2542 days.

(21) Appl. No.: 11/277,067

(22) Filed: Mar. 21, 2006

(65) Prior Publication Data
US 2007/0223446 A1   Sep. 27, 2007

(51) Int. Cl.
| | |
|---|---|
| *H04L 12/28* | (2006.01) |
| *H04L 29/06* | (2006.01) |
| *H04L 29/14* | (2006.01) |
| *H04L 12/24* | (2006.01) |

(52) U.S. Cl.
CPC ...... *H04L 29/06027* (2013.01); *H04L 65/1043* (2013.01); *H04L 69/40* (2013.01); *H04L 41/0213* (2013.01)

(58) Field of Classification Search
CPC ............. H04L 29/06027; H04L 65/1069; H04L 65/1009; H04L 65/103; H04L 65/1043; H04L 12/5695; H04L 29/06; H04L 41/0806; H04L 65/1006; H04L 65/1046; H04L 65/1073; H04L 12/1827; H04L 12/2602
USPC .................................................. 370/351, 352
See application file for complete search history.

(56) References Cited

U.S. PATENT DOCUMENTS

| | | | |
|---|---|---|---|
| 6,519,249 B1 * | 2/2003 | Bennefeld et al. ............ | 370/352 |
| 6,795,867 B1 * | 9/2004 | Ma et al. ....................... | 709/240 |
| 7,372,815 B2 * | 5/2008 | Ueno ............................ | 370/237 |
| 7,899,465 B1 * | 3/2011 | Ivanov et al. ............... | 455/456.1 |
| 2003/0167343 A1 * | 9/2003 | Furuno ......................... | 709/244 |
| 2004/0008710 A1 * | 1/2004 | Parra-Moyano et al. ..... | 370/422 |
| 2004/0132450 A1 * | 7/2004 | Schaade ..................... | 455/435.2 |
| 2004/0190442 A1 * | 9/2004 | Lee .............................. | 370/217 |
| 2006/0182130 A1 * | 8/2006 | Even et al. .................... | 370/401 |

* cited by examiner

*Primary Examiner* — Melanie Jagannathan
*Assistant Examiner* — Najeebuddin Ansari

(57) ABSTRACT

A system and method for maintaining provisioned configuration for an endpoint in a packet switched communications network are disclosed, the communications network utilizing a signalling protocol between the endpoint and at least one gatekeeper. The gatekeeper receives a request from the endpoint, determines the addresses of an assigned gatekeeper and at least one alternate gatekeeper, and transmits the addresses to the endpoint within the signalling protocol. The endpoint sends a message to its assigned gatekeeper, and if the assigned gatekeeper is responsive, the endpoint receives an indication confirming that the Gatekeeper is available. If the assigned gatekeeper is unresponsive, the endpoint registers with an alternate gatekeeper, but periodically sends a polling status request to its assigned gatekeeper, so that when the assigned gatekeeper becomes responsive, the endpoint may then register with its assigned gatekeeper.

13 Claims, 9 Drawing Sheets

SYSTEM AND METHOD FOR MAINTAINING A PROVISIONED CONFIGURATION FOR AN ENDPOINT IN A COMMUNICATIONS NETWORK

TECHNICAL FIELD

The present application is related to the field of network telephony and, in an example embodiment, to a system and method for maintaining a provisioned configuration for an endpoint in a communications network.

BACKGROUND

In the field of Internet Protocol (IP) Telephony/Voice over IP (VoIP), network administrators have a desire to configure devices (e.g., gateways and clients—hereafter referred to collectively as endpoints) with the address of a device to provide registration services (e.g., a gatekeeper, registrar or "call manager"—hereafter referred to as gatekeepers). The purpose of the gatekeeper is to provide network management functions, including keep track of endpoint status and providing call admission and call routing functions such as mapping IP addresses to endpoints based on telephone numbers, email addresses, or the like. The gatekeepers are designed in a fault-tolerant fashion such that the endpoints may fail over to an alternate gatekeeper during a failure situation. However, certain protocols, such as the H.323 protocol, currently do not provide a mechanism for these endpoints to automatically re-home to their previously assigned Gatekeeper once it becomes available again.

DETAILED DESCRIPTION

Figure 1:
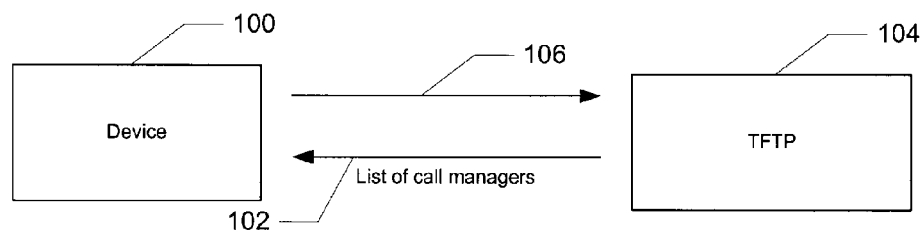
FIG. 1 shows a schematic block diagram of a prior art Skinny Client Control Protocol (SCCP) in which an SCCP endpoint receives a prioritized list of call managers.

At present by way of background, and with reference to FIG. 1, Skinny Client Control Protocol (SCCP) is a Cisco-proprietary protocol in which SCCP endpoints 100 receive a prioritized list of addresses, indicated by arrow 102, of up to three (primary, secondary, tertiary) CallManagers (e.g., a Cisco CallManager that provides a software-based call-processing component of the Cisco IP telephony solution) in their Trivial File Transfer Protocol (TFTP) configuration file. Significantly, this prioritized list is generated in TFTP 104 based on the configuration of the CallManager database, and is not signalled within the SCCP protocol itself. If at any time the administrator changes the list of prioritized CallManagers, the endpoint 100 receives an SCCP message 110 from its active CallManager telling it to reset, which in turn will cause the endpoint 100 to go fetch its TFTP configuration file again. The endpoint 100 will detect the change when it reads that file. In any event, the SCCP endpoint 100 then establishes a transmission control protocol (TCP) connection to the primary and secondary CallManager servers, and then sends SCCP register messages to the primary CallManager server. If at any time the primary CallManager server goes down (e.g., either the TCP connection is broken or a timeout occurs on a SCCP message), the endpoint 100 immediately starts sending register messages to the secondary CallManager server.

In use, the SCCP endpoint 100, typically a telephone, first needs to register with a CallManager. The endpoint 100, upon initialization, has no information regarding its CallManager. To address this, the endpoint 100 contacts the TFTP server 104 which then provides the endpoint 100 with its configuration file, indicated by arrow 106, that has its list of CallManager servers, e.g., CallManager one, CallManager two, or CallManager three. Thus, in this arrangement, two protocols (SCCP and TFTP) are being used together to achieve a desired result.

The International Telecommunication Union (ITU) H.323 specification defines the protocols to provide audio-visual communication sessions on any packet network. It is currently implemented by various Internet real-time applications, such as Cisco's Voice Gateways, CallManager and IP Videoconferencing devices.

In particular, the H.323 specification provides a mechanism for providing fault tolerance and load balancing of Registration, Admission and Status (RAS) communications between endpoints and their gatekeepers. For example, the H.323 protocol may be used instead of, or in conjunction with SCCP. Most H.323 endpoint implementations today allow the user/administrator of the endpoint to statically configure the IP address of the gatekeeper the endpoint should register with. Upon registering with this primary gatekeeper, the endpoint may receive a list of addresses of alternate gatekeepers, in prioritized order, with which it may register if it does not receive a reply from its primary gatekeeper. The endpoints may also use the multicast-based gatekeeper discovery mechanism defined in the H.323 specification. Some endpoint implementations rely on other network services outside the scope of the H.323 specification, such as DHCP site-specific options, TFTP configuration files, SNMP MIB's or other means to provide this required information to the endpoint.

Gatekeeper discovery is the process an endpoint uses to determine which gatekeeper with which to initially register. This may be done manually or automatically. In manual discovery, the endpoint is configured with the transport address (e.g. IP address and port number) of the associated gatekeeper, and may be entered, for example, either at endpoint configuration or into an initialization file. In this way, the endpoint knows a priori which gatekeeper with which to communicate. The endpoint can then register with that gatekeeper.

Figure 2:
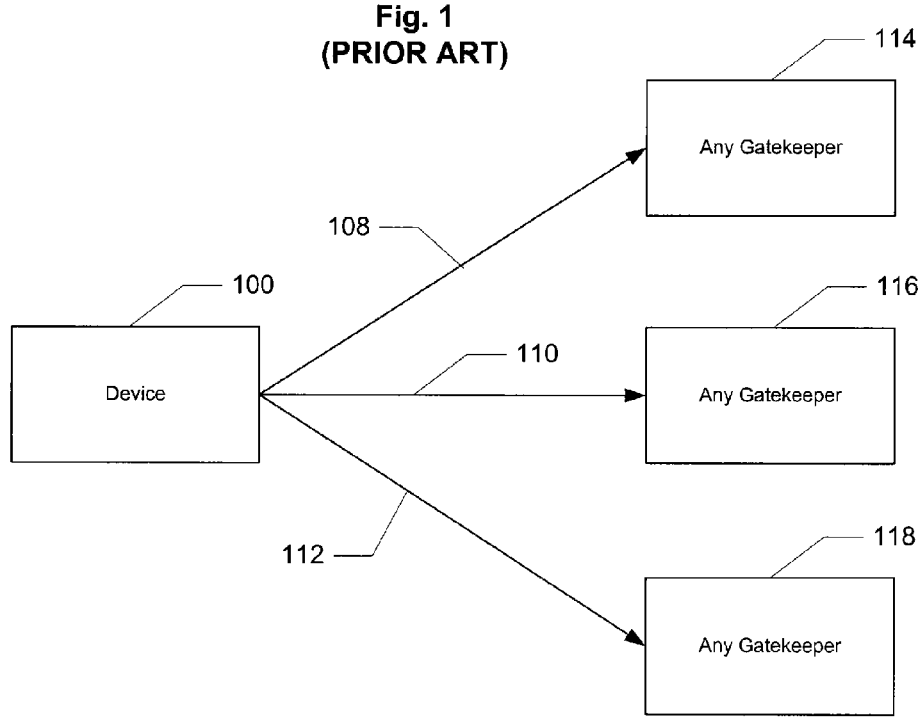
FIG. 2 shows a schematic block diagram of a prior art gatekeeper discovery methodology.

The automatic method advantageously allows the endpoint-gatekeeper association to change over time. The endpoint may not know who its gatekeeper is or may need to identify another gatekeeper due to a failure. This may be done through auto discovery. Auto discovery allows for lower administrative overhead in configuring individual endpoints and additionally allows replacement of an existing gatekeeper without manually reconfiguring all of the affected endpoints. In the automatic method, and with reference now to FIG. 2, the endpoint 100 typically multicasts a Gatekeeper Request (GRQ) message, indicated by arrows 108, 110 and 112 asking, "Who is my gatekeeper?" This is sent to the gatekeeper's well-known Discovery Multicast Address. One or more gatekeepers, 114, 116 and 118, may respond with the Gatekeeper Confirmation (GCF) message indicating "I can be your gatekeeper" and containing the transport address of the gatekeeper's RAS channel. If a gatekeeper 114, 116, 118 does not want the endpoint 100 to register with it, it may return a Gatekeeper Reject (GRJ) message. If more than one gatekeeper responds, the endpoint may choose the gatekeeper it wants to use. At this point, the endpoint knows which gatekeeper with which to register. The endpoint can then register with that gatekeeper.

In order to provide redundancy in systems which use a gatekeeper, the gatekeeper may indicate alternate gatekeepers that may be used in the event of a primary gatekeeper failure. This list of alternate gatekeepers is provided in the alternate-Gatekeeper field of RAS messages sent by the gatekeeper to the endpoint (e.g. such as in the GCF/GRJ, messages described above).

Figure 3:
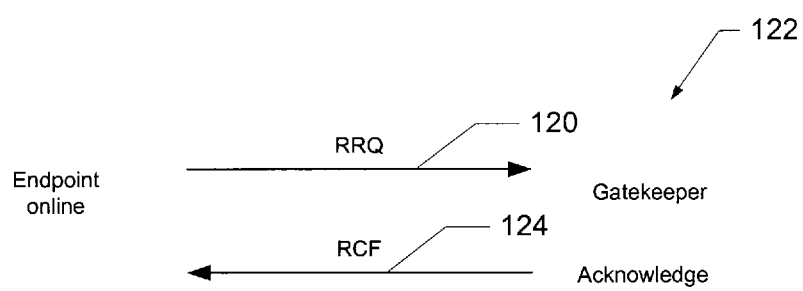
FIG. 3 shows a schematic block diagram of a prior art endpoint's request for registration with a gatekeeper.

After Gatekeeper Discovery has occurred, as shown in FIG. 3, the endpoint sends a registration request (RRQ) message, indicated by arrow 120, to a gatekeeper 122 which is essentially an attempt to register. This is referred to as a full registration, in which all relevant information regarding the endpoint is included in the actual registration request 120. This could be done either as a multicast or a unicast. The gatekeeper 122 acknowledges that with a registration confirm (RCF), indicated by arrow 124.

In order to keep the registration up-to-date, the gatekeeper and the endpoint both periodically check that the other is still alive. To achieve this, endpoints may use RRQs to refresh their registration status with the gatekeeper, and gatekeepers may use IRQs to inquire as to an endpoints status. Thus, when the gatekeeper goes down, the endpoint would continue to periodically send an RRQ to the gatekeeper with which it is registered. Typically, this particular RRQ would be a lightweight RRQ, in the sense that only basic identification information is sent as the gatekeeper already knows the endpoint. In the event of the gatekeeper failing, the endpoint will still try to send the RRQ to the gatekeeper. However, the endpoint will not get any acknowledgement back from the gatekeeper and will then send an RRQ to an alternate gatekeeper. It is to be noted that, at present, a prior art endpoint will not re-home to the first gatekeeper, even after the first gatekeeper comes back online, unless the endpoint is reset, which generally requires human intervention.

H.323 also provides an Alternate Gatekeeper feature, which comes to the fore when a gatekeeper to which a particular endpoint is registered fails to respond to any of the endpoint's RAS messages. However, once the endpoint fails over to an alternate gatekeeper, the endpoint remains registered with that alternate gatekeeper indefinitely, until another situation occurs which may cause the endpoint to fail over to another alternate gatekeeper, or the endpoint is reset causing it to go back through the Gatekeeper Discovery process anew. This poses a problem for network administrators trying to construct large, distributed H.323 network designs. As will be described in more detail below, the network can de-stabilize over time as the endpoints end up being indefinitely registered to their alternate gatekeeper(s). It would therefore be desirable for the endpoints to re-home to their primary (previously assigned or pre-provisioned) gatekeeper when their primary gatekeeper becomes available again.

The following two sample scenarios further illustrate how the lack of a re-homing mechanism can negatively impact the customer's network.

Example Scenario 1

Traffic Engineering and Load Balancing

Figure 4:
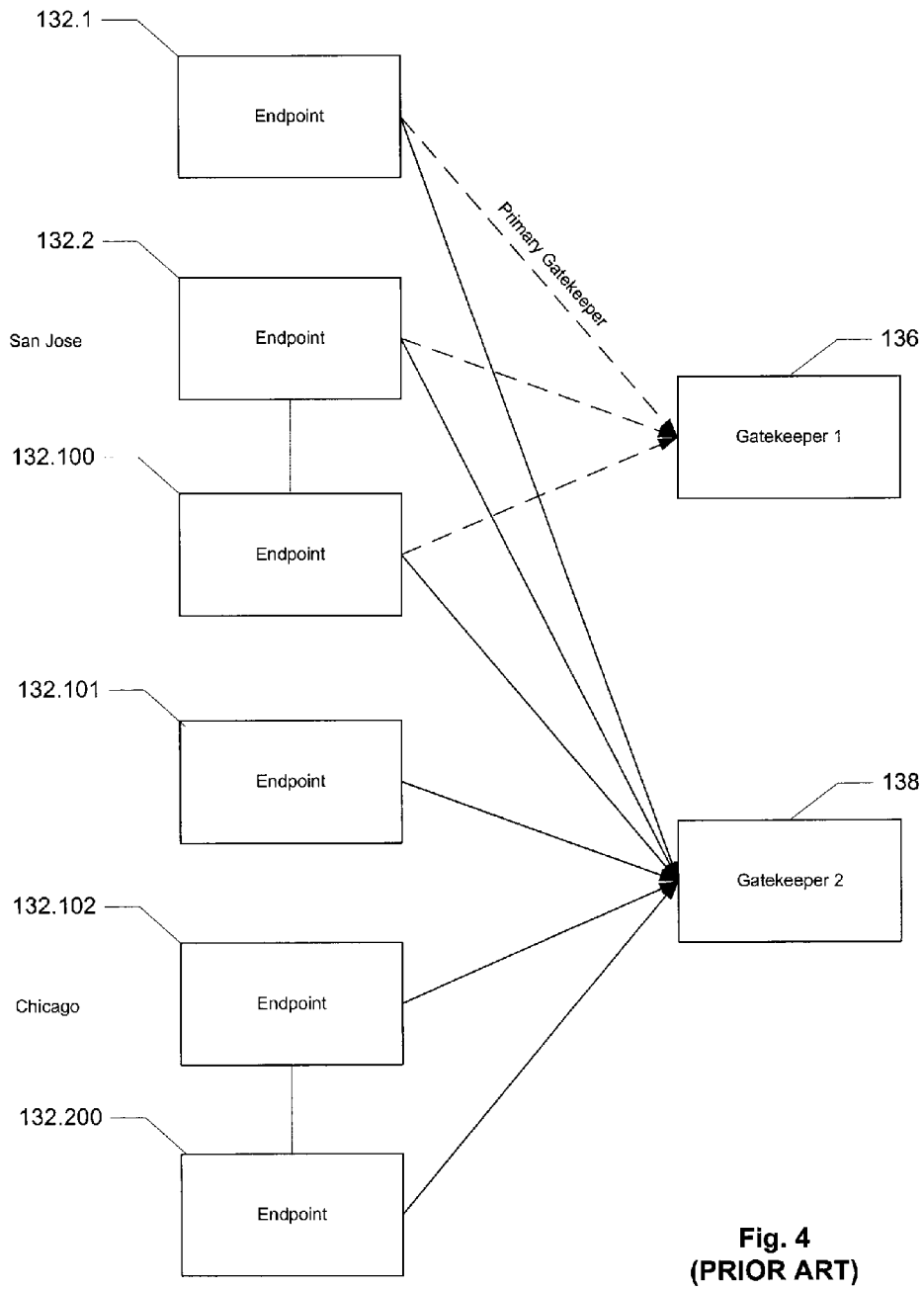
FIG. 4 shows a schematic block diagram highlighting an example problem of existing systems in which, after transfer to another gatekeeper, no provision is made for the endpoint to re-home to its original gatekeeper.

Referring to FIG. 4, an example network topology shows a customer having two large locations: one in San Jose and one in Chicago. All smaller remote sites 132.1, 132.2 . . . 132.200 are connected via a WAN to both of these two locations, and each of the two locations contains a data center in which core networking services, including their H.323 gatekeepers 136 and 138, respectively, reside. As part of the traffic engineering design, the customer has decided that remote sites 1-100 should use the gatekeeper 136 in San Jose as their primary and the gatekeeper 138 in Chicago as their alternate, and vice versa for remote sites 101-200. The gatekeepers 136, 138 in both locations are capable of sustaining the full load of all 200 sites in the event that one of the gatekeepers 136, 138 becomes unavailable.

When the gatekeeper 136 in San Jose becomes unavailable, all endpoints 132.1 to 132.100 at sites 1-100 will fail over to their alternate gatekeeper 138 in Chicago, which will assume the full load of all 200 locations. However, when the San Jose gatekeeper 136 becomes available again, the endpoints in sites 1-100 will remain registered to the Chicago gatekeeper 138 indefinitely. The Chicago gatekeeper 138 will continue carrying the full load for all 200 sites, while the San Jose gatekeeper 136 will be completely unutilized, or at best, underutilized.

Example Scenario 2

Geographically Dispersed Gatekeepers

A customer with a global Wide Area Network (WAN) wishes to deploy H.323 gatekeepers to manage their IP telephony environment, which consists of IP-based PBX's located within each of their large offices around the globe, namely, for example, Santa Clara, Calif., Austin, Tex., and Bangalore, India. The PBX's are internetworked over the WAN using the H.323 protocol and the gatekeepers are used for dial plan resolution and bandwidth management between the PBX's. To make best use of the gatekeeper's bandwidth management capabilities, and to provide fault tolerance for RAS communications, the customer would like to place one or more gatekeepers at each office, co-resident with the PBX's, and to configure them as alternate gatekeepers so that they will back each other up in the event that any of the PBX's loses connectivity with its primary gatekeeper.

When, for example, the Bangalore gatekeeper becomes unavailable, the PBX in Bangalore will fail over to one of the alternate gatekeepers in Santa Clara or Austin. While this is acceptable for a short duration (e.g., until the problem with the Bangalore gatekeeper can be resolved), the PBX in Bangalore will remain registered with its alternate gatekeeper indefinitely. Since the round trip time (RTT) for packets from Bangalore to Santa Clara or Austin is excessive, this may produce longer than average call setup times, and a less than efficient use of bandwidth and gatekeeper resources. Over time, the situation can only get worse as the Santa Clara PBX ends up registered with the Austin or Bangalore gatekeepers and the Austin PBX ends up registered with the Santa Clara or Bangalore gatekeepers, and the network may no longer be optimized and, could potentially result in an overall de-stabilization of the H.323 network.

It would thus be desirable to provide a system and method for maintaining provisioned configuration for an endpoint in a communications network. During network operation, failures force endpoints to find alternate devices, yet there is no means to force devices back into the previously provisioned configuration.

Example New Gatekeeper Assigning and Re-Homing Functionality

In an example embodiment, the H.323 RAS protocol introduces a new concept called an "Assigned Gatekeeper" referred to hereinafter as the AssignedGK. In an example embodiment, a new field called "AssignedGK" is added, for example, to the alternate gatekeeper elements of RAS messages sent from the gatekeeper to the endpoint. It should however be noted that the methodology described herein is not limited to RAS messages. In the event that the endpoint has been statically configured with the address of its gatekeeper, the statically configured gatekeeper address may be that endpoint's AssignedGK by default. In the event that the endpoint uses multicast-based gatekeeper discovery, the first gatekeeper the endpoint finds that will accept its registration may be that endpoint's AssignedGK by default. For endpoints that use DHCP, TFTP, SNMP or other such mechanisms, these may be treated the same way as if the gatekeepers address was statically configured in the endpoint—the address received via any of these mechanisms may be that endpoint's AssignedGK by default.

Figure 5:
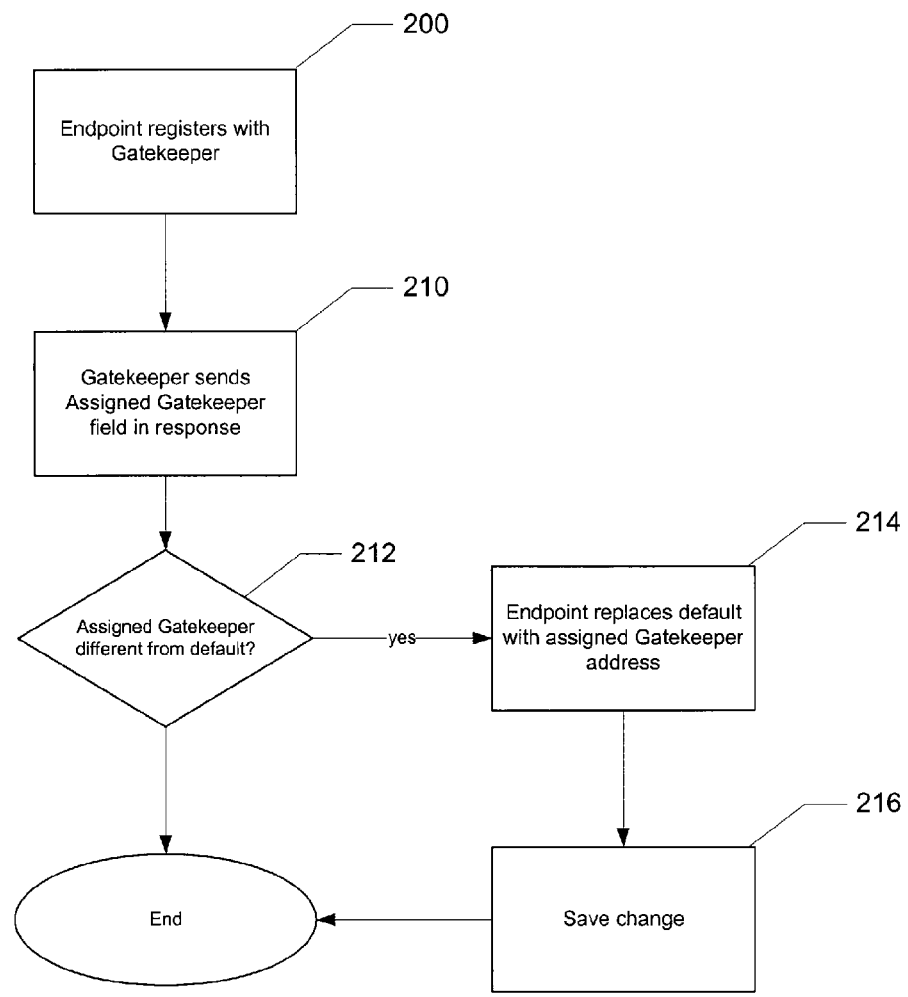
FIG. 5 is a flow chart showing a method of assigning a gatekeeper in accordance with an example embodiment.
Figure 6:
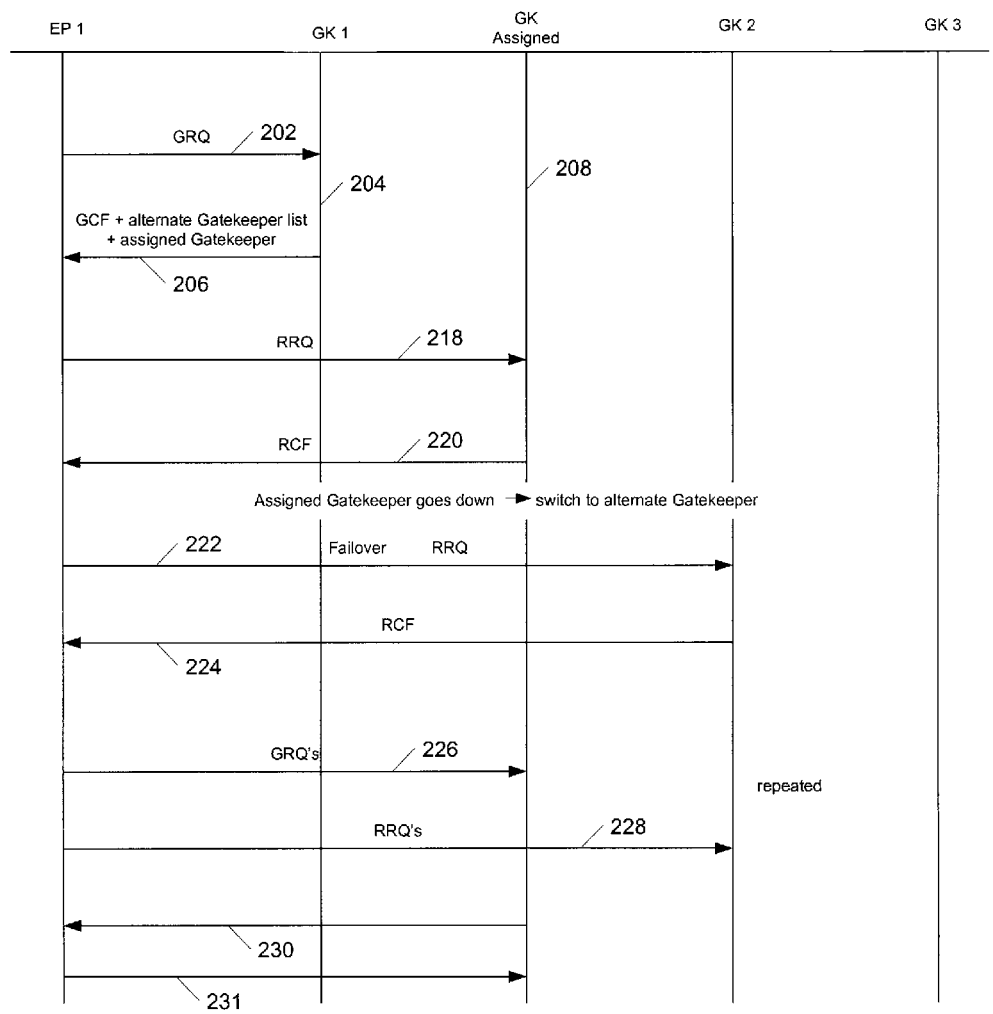
FIG. 6 shows a ladder chart of example messages that are communicated in accordance with an example embodiment.

Turning now to FIGS. 5 and 6, the endpoint EP1 first registers with any of its gatekeepers. This is indicated by block 200 in FIG. 5, and arrow 202 in FIG. 6. The gatekeeper 204, in this case Gatekeeper One, is shown to respond with a GCF, indicated by arrow 206, which includes a list of EP1's alternate gatekeepers and its assigned gatekeeper, AssignedGK 208. The receipt of the AssignedGK field from the gatekeeper 204 is indicted by block 210 in FIG. 5. Thus, in an example embodiment, the IP addresses of the assigned and one or more alternate gatekeepers are pushed to the endpoint. Merely by way of example, and not by limitation, the IP addresses may be communicated in RAS messages of the H.323/H.225.0 signalling protocol.

In an example embodiment, if the received AssignedGK field is different from its default AssignedGK address, as indicated by decision block 212, the endpoint uses the address received in the AssignedGK field as its AssignedGK, as indicated by block 214. This replaces the address it used by default, as indicated by block 216, with the address (optionally) being saved so that the change is persistent through reboots. This provides the administrator of the gatekeeper a central way to change the address that the endpoint stores as its Assigned Gatekeeper. This may be especially useful for endpoints that use statically programmed gatekeeper addresses.

However, adherence to the above is optional, since some network devices rely on other centralized means (e.g., DHCP, TFTP, SNMP, etc.) to accomplish the same goal. The endpoint may choose to ignore the AssignedGK field if a vendor device prefers to use one of those other mechanisms instead. Alternatively, these mechanisms can be combined so that the endpoint still uses one of the above listed methods to initially discover its default gatekeeper but honors the AssignedGK field it receives once it registers with any of its gatekeepers. In an example embodiment, this may be an advantageous combination. For example, the endpoint may use a DHCP site-specific option or a TFTP configuration file to "bootstrap" itself into learning the address of a gatekeeper with which it can register, but once it goes to that gatekeeper to register it may be told of the address of its AssignedGK.

Likewise, for endpoints that use a multicast-based gatekeeper discovery method to "bootstrap" themselves, when the endpoint discovers a gatekeeper that will accept its registration the gatekeeper may provide it with an AssignedGK address. The endpoint may then store this address in its configuration so that it is persistent through reboots, or may choose to erase this information upon reboot, so as to always go through the gatekeeper discovery process each time it starts up.

Thus, in an example embodiment, a method is provided of defining gatekeepers in a packet switched communications network utilizing a signalling protocol between the gatekeepers and an endpoint. Generally, in response to a request from the endpoint, the gatekeeper may determine an assigned gatekeeper and at least one alternate gatekeeper for the endpoint. Thereafter, addresses of the assigned gatekeeper and at least one alternate gatekeeper may be communicated to the endpoint within the signalling protocol.

Now that the endpoint knows the address of its AssignedGK, and with reference now to FIG. 6, the endpoint EP1 may send an RRQ message, indicated by arrow 218, to its assigned gatekeeper 208, and, in the normal course of events, the EP1 would receive an RCF message in return, as indicated by arrow 220. If the assigned gatekeeper 208 stops sending RCF messages, due to, for example, the assigned gatekeeper 208 failing, the endpoint EP1 will send an RRQ to one of its alternate gatekeepers, such as gatekeeper GK2, as indicated by arrow 222. In the normal course of events, gatekeeper GK2 will send an RCF message back to endpoint EP1, as indicated by arrow 224, so that endpoint EP1 is now registered with gatekeeper GK2. It should be noted that the alternate gatekeepers which the endpoint communicates with may be prioritized.

Significantly, in an example embodiment the endpoint EP1 may implement a new polling procedure in which the endpoint EP1 periodically polls its primary or assigned gatekeeper to monitor when it once again becomes responsive. For example, the endpoint may send GRQ's (or any other messages) to its AssignedGK in an attempt to discover whether it is available again or not, as indicated by arrow 226. It will however be appreciated that RRQs, or any polling mechanism could also be used.

As soon as the endpoint EP1 receives an indication that the assignedGK is once again responsive (e.g., by receiving a GCF message from its AssignedGK it), it may (e.g., immediately) attempt to register with its AssignedGK. Upon successful registration, it may (e.g., immediately) stop communication with its alternate gatekeeper. Thus, EP1 has now "re-homed" to its AssignedGK, as indicated by arrows 228 and 230. Thus, the endpoint has been re-homed to its assignedGK and now once again communicates with its assignedGK as shown by arrow 231. Communication with its alternateGK (Gatekeeper 2) is thus terminated. It will be appreciated that any outstanding requests may still be acknowledged by the former alternateGK, but new requests from the endpoint are directed to the new current GK (assignedGK).

The Assigned Gatekeeper may thus be an extension of the Alternate Gatekeeper procedures described above. The combination of these two procedures may provide a more robust redundancy scheme allowing the endpoint to "fail over" to one of its Alternate Gatekeepers when its Assigned Gatekeeper becomes unresponsive, and then to "re-home" to its Assigned Gatekeeper when it becomes responsive again.

In an example embodiment, the assignedGatekeeper field shall only be included if the alternateGatekeeper field is also present, even if the alternateGatekeeper list is empty. If the endpoint supports the Assigned Gatekeeper procedures described in the abovementioned example embodiment, it may include the supportsAssignedGK field in its RAS messages. In an example embodiment the methodology described herein may also be deployed in a SIP environment and, accordingly, different messages, fields, and/or syntax may be used.

In an example embodiment, only one gatekeeper may be designated as the endpoint's Assigned Gatekeeper at any time. The address of the Assigned Gatekeeper may be, for example, communicated to the endpoint in the assignedGatekeeper field of RAS messages. If the Gatekeeper does not include the assignedGatekeeper field, or returns an empty assignedGatekeeper field, the endpoint may treat its current gatekeeper as its default Assigned Gatekeeper. This allows endpoints to implement the re-homing mechanism described herein even if the gatekeeper does not explicitly support the Assigned Gatekeeper procedures. In an example embodiment where the endpoint is configured with its gatekeeper address via some a priori means, the endpoint may treat this gatekeeper as its Assigned Gatekeeper by default. In an embodiment in which the endpoint uses the multicast GRQ mechanism to dynamically discover an available gatekeeper, the gatekeeper which responds with a GCF may be the endpoint's Assigned Gatekeeper by default. If more than one gatekeeper responds, and none of them include an assignedGatekeeper address, the endpoint may choose the gatekeeper it wants to use as its default Assigned Gatekeeper. If more than one responds with an assignedGatekeeper address, the endpoint may choose the response from which to extract the assignedGatekeeper address.

As described above, the address of the assignedGatekeeper may change over time. In an example embodiment, any time the endpoint receives an assignedGatekeeper address that is different than its current assignedGatekeeper address, the endpoint may accept the address as its new Assigned Gatekeeper and immediately begin following the re-homing procedures described herein with reference to example embodiments to register with its Assigned Gatekeeper. This allows the administrator an automated method of changing the endpoint's Assigned Gatekeeper without having to reprogram the endpoints. It should be noted that the gatekeeper may maintain a database/data store to store this information and provide an interface for an administrator to provision these associations.

Figure 7:
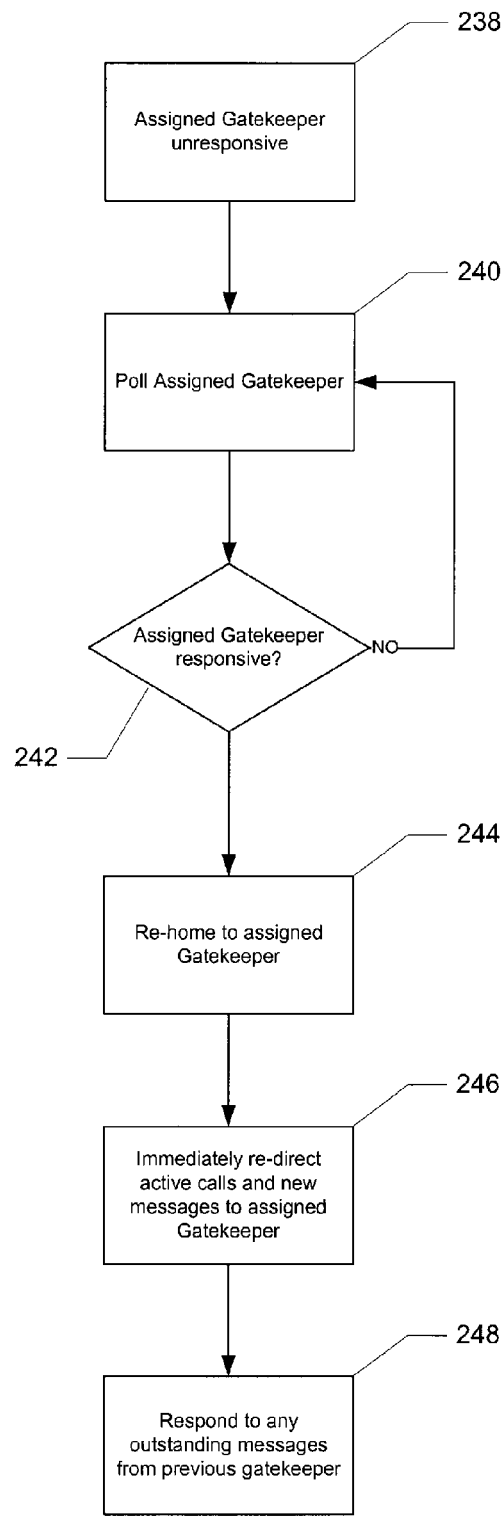
FIG. 7 is a flow chart showing example detail of method, in accordance with an example embodiment, of re-homing an endpoint back to its assigned gatekeeper.

Turning now to FIG. 7, when an endpoint's Assigned Gatekeeper becomes unresponsive, as indicated by block 238, in an example embodiment the endpoint begins a polling mechanism by sending (or at least initiating) periodic messages (e.g., GRQ messages) to its Assigned Gatekeeper in an effort to re-home, as indicated by block 240. Once the Assigned Gatekeeper begins responding again (e.g., the endpoint receives a GCF to one of these GRQ's), as indicated by decision block 242, the endpoint attempts to re-home to its Assigned Gatekeeper by sending it an RRQ, as indicated by block 244. If the endpoint is registered to another gatekeeper when it attempts to initiate this re-homing procedure, the endpoint does not need to send a URQ to its current gatekeeper. The endpoint may assume that the new Assigned Gatekeeper is prepared to accept requests relating to existing calls, and the new Assigned Gatekeeper may be prepared to handle such messages, as indicated by block 246. This allows active calls and outstanding messages between the endpoint and the current gatekeeper to continue during the re-homing procedure. If the endpoint receives a response to an outstanding request from a gatekeeper after re-homing to its Assigned Gatekeeper, the endpoint may accept the response and proceed normally, as indicated by block 248. However, all subsequent messages related to that call and existing active calls may be directed to the Assigned Gatekeeper to which it is now registered. During this transition, there may be a short period of time in which the gatekeepers have not yet synchronized on the state of the endpoints registration and both gatekeepers send IRQ's to the endpoint to determine the status of the call. In these circumstances, the endpoint may respond to IRQ's only from the Assigned Gatekeeper to which it is now registered.

If the endpoint receives a reject message from its gatekeeper, such as a GRJ, RRJ or ARJ (or receives a URQ from its Gatekeeper) containing a list of Alternate Gatekeepers and an alternateGKisPermanent field is set to TRUE, the endpoint may follow the Alternate Gatekeeper procedures as described by way of example above by assuming that the needToRegister field is TRUE and sending an RRQ to one of its Alternate Gatekeepers. However, the endpoint may also immediately begin the polling mechanism described above in an effort to re-home to its Assigned Gatekeeper (e.g., as soon as possible). In an embodiment, if the Gatekeeper wants to permanently redirect the endpoint to an Alternate Gatekeeper and does not want the endpoint to re-home to it, it may provide the endpoint with a new assignedGatekeeper address or remove the Assigned Gatekeeper value by sending an empty assignedGatekeeper field.

In an example embodiment, any time the endpoint receives a new assignedGatekeeper address it may ignore the needToRegister field and assume that the value is TRUE. If the alternateGKisPermanent field is set to FALSE, and the address of the assignedGatekeeper field is different than the endpoints current Assigned Gatekeeper value, the endpoint may ignore the fact that the alternateGKisPermanent field was set to FALSE and may retransmit the message to its new Assigned Gatekeeper. In an example embodiment, only if that gatekeeper does not respond, the endpoint may proceed to follow the Alternate Gatekeeper procedures described above by retransmitting the message to its list of Alternate Gatekeepers. In an embodiment, since a new Assigned Gatekeeper value was provided, it may immediately begin the polling mechanism in an effort to re-home to the new Assigned Gatekeeper.

In an example embodiment, if at any time the gatekeeper wishes to clear the endpoints Assigned Gatekeeper value, it may send the endpoint an empty assignedGatekeeper field. The endpoint may reset its Assigned Gatekeeper to a default value again. The endpoint may then use the gatekeeper it is currently registered to as its new default Assigned Gatekeeper or may go back to using the Assigned Gatekeeper it discovered during its initialization sequence (e.g., its a priori gatekeeper or the gatekeeper it discovered via the multicast method) as its default Assigned Gatekeeper.

The gatekeeper may include the assignedGatekeeper field in any GCF, RCF, ACF, UCF, DCF or IRR message. In an example embodiment, this allows the Alternate Gatekeeper simultaneously to accept the endpoint's request to register or place a call, and to communicate back to the endpoint the address of its Assigned Gatekeeper. If the address provided is different than the endpoint's current Assigned Gatekeeper value, the endpoint may immediately begin the polling mechanism described above in an attempt to re-home to its new Assigned Gatekeeper.

The Gatekeeper may optionally include a gatekeeperIdentifier value in the assignedGatekeeper field. This may be useful when the Assigned Gatekeeper manages multiple zones and hence has multiple gatekeeperIndentifiers configured. If the gatekeeperIndentifier sent by the endpoint does not match any of the gatekeeper's configured identifiers, the gatekeeper may return a reject message. The reject message may include the correct gatekeeperIndentifier value in the assignedGatekeeper field in which case the endpoint should retransmit the request with the correct gatekeeperIndentifier value. Alternatively, the gatekeeper may provide an empty gatekeeperIndentifier value in the assignedGatekeeper field, in which case the endpoint may retransmit the request with an empty gatekeeperIndentifier value.

Conveniently, when the endpoint receives the RCF from its AssignedGK, it does not need to send Disengage Requests (DRQs) for all of its active calls to the alternate gatekeeper with which it was previously registered. Any calls in progress may remain connected through the alternate gatekeeper, which may be particularly important if that gatekeeper is operating in routed mode and is maintaining the H.225.0 and/or H.245 connections, and the AssignedGK may query the endpoint via Information Requests (IRQs) to learn the status of those calls. Likewise, the endpoint need not send an Unregistration Request (URQ) to its alternate gatekeeper. The mere fact that the endpoint is now registered to its AssignedGK and immediately stops sending RRQs to its alternate gatekeeper is enough to allow the gatekeepers to synchronize state and determine that the endpoint has re-homed to its AssignedGK.

In an example embodiment, a synchronization protocol such as Gatekeeper Update Protocol (GUP) (a proprietary protocol used by Cisco IOS Gatekeepers) may used between the gatekeepers for exchanging endpoint registration status and other information. It is however to be noted that the deployment of the methodologies described herein are not limited to networks utilizing such a synchronization protocol, nor do they require the gatekeepers to keep sync at all.

Figure 8:
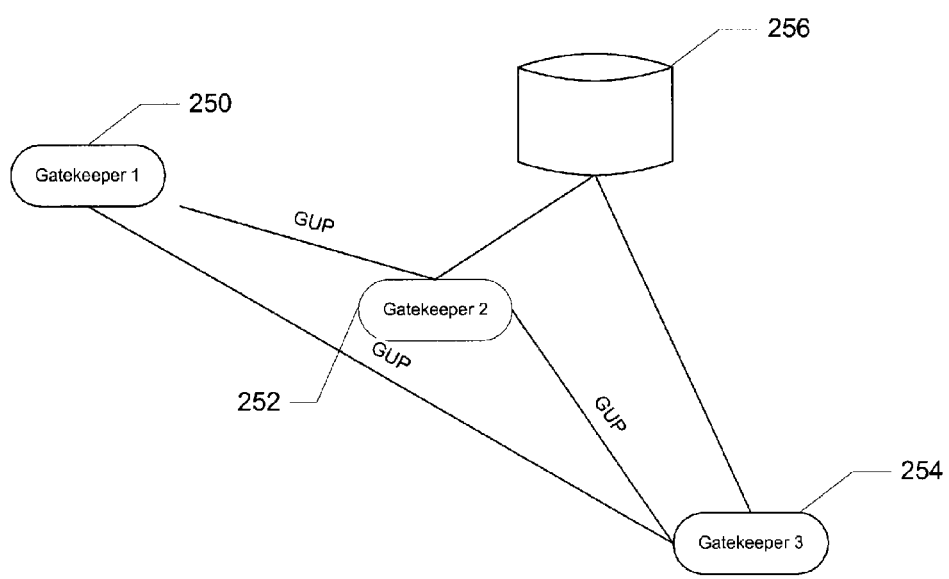
FIG. 8 is a block diagram showing the interconnection of a plurality of gatekeepers using an example synchronization protocol.

As indicated above, and with reference now to FIG. 8, gatekeepers 250, 252 and 254 may be (e.g., continuously) in communication with each other via a synchronization protocol (such as Cisco's GUP). A database 256 may be provided to associate each endpoint with its assigned gatekeeper. This is merely an example and any other synchronization protocol (or none at all as synchronization between gatekeepers is optional) may be used.

In an example embodiment, in the event that the fail over to the alternate gatekeeper was not permanent (e.g., the AssignedGK decided to load-balance only a single RAS message off onto an alternate gatekeeper by setting the AltGKisPermanent flag to FALSE in any of its responses) the new polling mechanism described above may not apply. For example, the endpoint may respond as prescribed in the existing H.323 specification by resending only that specific message to its alternate gatekeeper, and then continue sending all future messages to its AssignedGK as normal.

In an example embodiment, in the event that the AssignedGK wants to permanently load-balance the endpoints registration off onto another gatekeeper and does not want the endpoint to come back to it as its AssignedGK anymore, the gatekeeper may set the AssignedGK address to the address of the gatekeeper it wishes the endpoint to move to. The AssignedGK field may be used in conjunction with the AlternateGK element. This allows the gatekeeper to instruct the endpoint to permanently move to the new AssignedGK while at the same time providing the endpoint with a list of other alternate gatekeepers in the event that the new AssignedGK does not respond. The endpoint may then immediately begin polling its new AssignedGK and as soon as it receives a successful response it may stop sending RRQs to the previous gatekeeper (which may now be one of its alternate gatekeepers if it including itself in the list of Alternate Gatekeepers provided to the endpoint) and any calls in progress should be unaffected.

Figure 9:
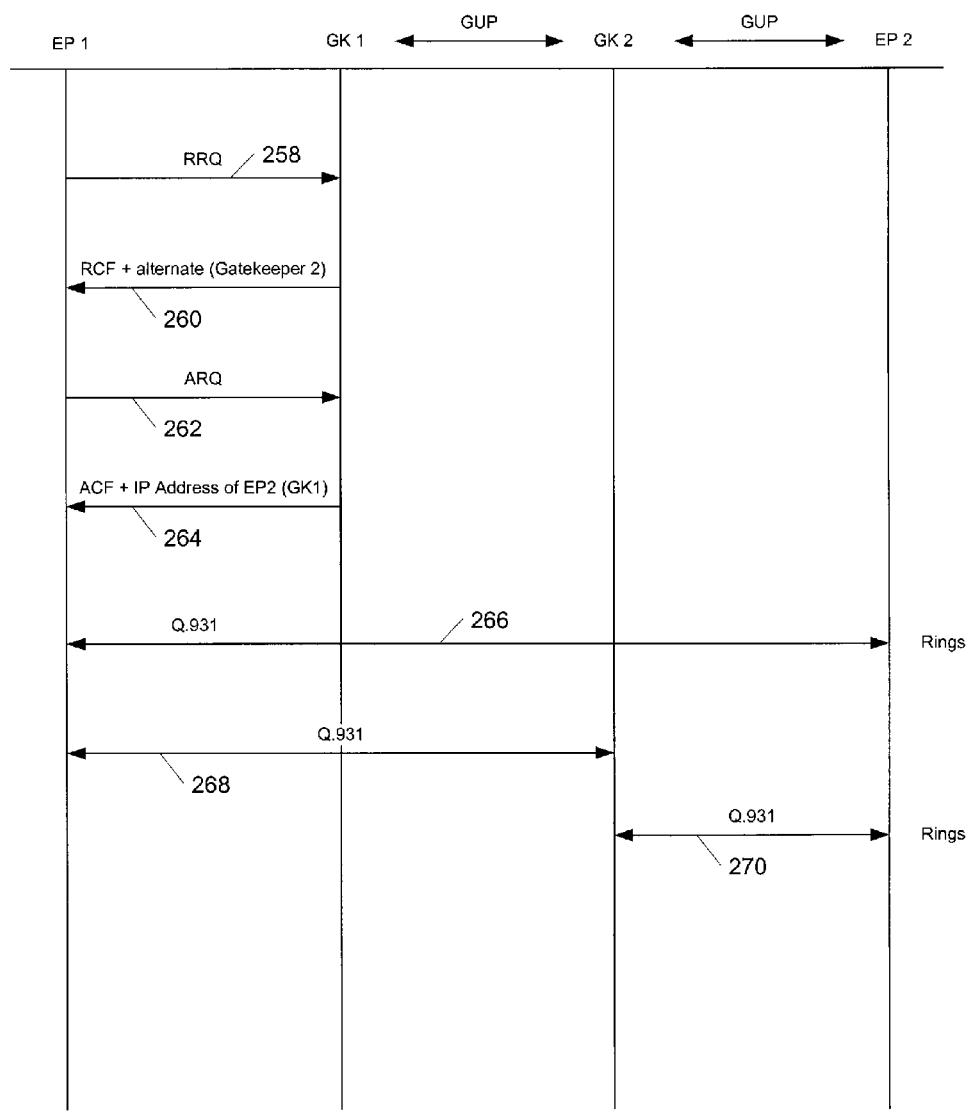
FIG. 9 shows a ladder chart for both direct and gatekeeper-routed communication methodologies.

In an example embodiment there may be two possible communication routes, namely a direct routed and a gatekeeper-routed methods. These routes will now be described by way of example with reference to FIG. 9.

In the example direct route, the first two operations shown to include the registration request (RRQ) and associated response (RCF), indicated by arrows 258 and 260, respectively, and the admission request (ARQ) and associated response (ACF), indicated by arrows 262 and 264, between endpoint EP1 and gatekeeper GK1. The Admission Confirm may serve to indicate the IP address associated with the telephone number or email address that the endpoint has dialed At this stage, endpoint EP1 has got a positive confirmation that it is allowed to make the call, with it being provided the IP address of that endpoint. At that point, a portion of H.225 is used, with Q.931 being used to establish the connection between endpoint EP1 and endpoint EP2, as indicated by arrow 266. A Q.931 setup is sent to endpoint EP2. At that point, the gatekeeper is functioning properly, and (from the gatekeepers perspective) the call has been established. Conveniently, the gatekeeper may periodically send the endpoint(s) an information request (IRQ), to determine whether they are still on the call. An information response (IRR) is sent back reflecting the correct status.

In the gatekeeper-routed method, the situation may be substantially the same as the direct route, except that when the telephone number or email address of endpoint two is dialed, the Admission Confirm may include the IP address of gatekeeper GK2. Thereafter, Q.931 is used, but instead of it going directly to endpoint EP2, it first goes to gatekeeper GK2, as indicated by arrow 268, and the gatekeeper then routes it to endpoint EP2, as indicated by arrow 270.

The present application thus provides an automated way for allowing network administrators to tightly control resources and to know, as much as possible, which devices are utilizing which resources.

Figure 10:
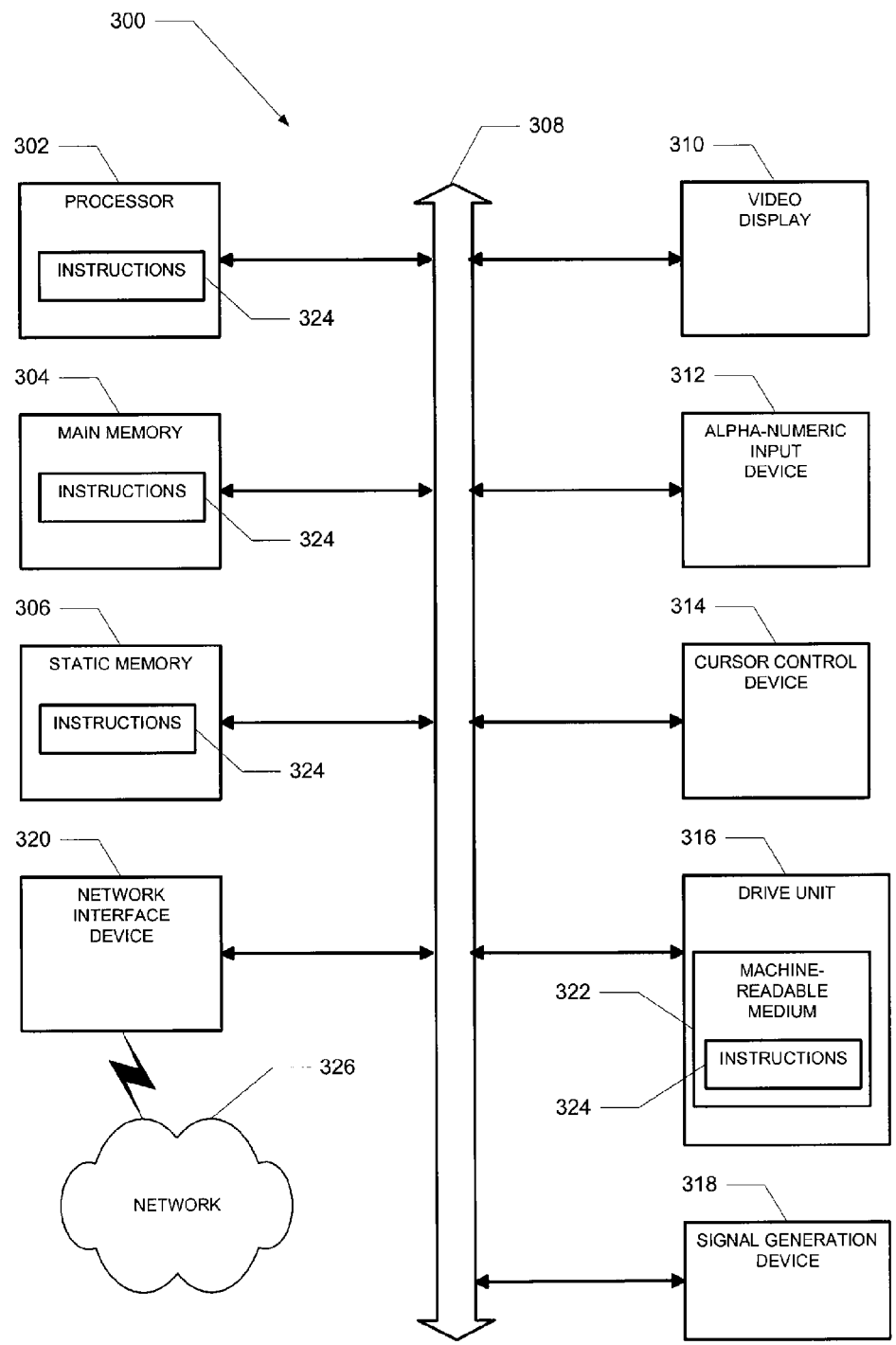
FIG. 10 shows a diagrammatic representation of a machine in the example form of a computer system within which a set of instructions, for causing the machine to perform any one or more of the methodologies discussed herein, may be executed.

FIG. 10 shows a diagrammatic representation of machine in the example form of a computer system 300 within which a set of instructions, for causing the machine to perform any one or more of the methodologies discussed herein, may be executed. In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although the present application have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of providing gatekeepers to an endpoint in a packet switched communications network to maintain a provisioned configuration, the communications network utilizing a signaling protocol between the endpoint and the gatekeepers, the method comprising:
   sending, during gatekeeper discovery, a gatekeeper request to a first gatekeeper from the endpoint within the signaling protocol;
   receiving, from the first gatekeeper, the identity of an assigned gatekeeper and the fact that the assigned gatekeeper is designated as the assigned gatekeeper to the endpoint via dedicated assigned gatekeeper field in a communication utilizing the signaling protocol, wherein the assigned gatekeeper is a second gatekeeper different from the first gatekeeper;
   receiving the addresses of the assigned gatekeeper and a plurality of alternate gatekeepers to the endpoint within the signaling protocol, the alternate gatekeepers being prioritized and being different from the first and second gatekeepers;
   setting the assigned gatekeeper as a default gatekeeper;
   in response to an assigned gatekeeper being unresponsive:
     selecting an alternate gatekeeper based on the relative priority of the plurality of alternate gatekeepers;
     sending a communication from the endpoint to the selected alternate gatekeeper;
     if the selected alternate gatekeeper is responsive, registering with the selected alternate gatekeeper; and
     periodically sending from the endpoint a polling status request to the assigned gatekeeper until the endpoint receives a confirmation message from the assigned gatekeeper, thereby to monitor when the assigned gatekeeper is once again responsive; and
   selectively re-registering with the assigned gatekeeper in response to the assigned gatekeeper being once again responsive, wherein the assigned gatekeeper is a reconfigurable default gatekeeper for the endpoint.

2. The method of claim 1, wherein selectively re-registering with the assigned gatekeeper in response to the assigned gatekeeper being once again responsive comprises:
   terminating communication between the endpoint and the selected alternate gatekeeper; and
   resuming communication between the endpoint and the assigned gatekeeper.

3. The method of claim 1, wherein sending a communication from the endpoint to the selected alternate gatekeeper comprises sending an RRQ message.

4. The method of claim 1, wherein monitoring when the assigned gatekeeper is once again responsive is performed while the endpoint is still registered with the selected alternate gatekeeper.

5. The method of claim 1, wherein monitoring when the assigned gatekeeper is once again responsive comprises sending Gatekeeper Request (GRQ) or Registration Request (RRQ) messages.

6. The method of claim 1, which comprises receiving the addresses of the assigned gatekeeper and the at least one alternate gatekeepers within the signaling protocol.

7. The method of claim 6, which comprises receiving the addresses of the assigned gatekeeper and the alternate gatekeepers in Registration, Admission and Status (RAS) messages of the H.225.0 signaling protocol.

8. The method of claim 1, which comprises statically configuring the endpoint with an IP address of its assigned gatekeeper.

9. The method of claim 1, which comprises dynamically configuring the endpoint with an address of a gatekeeper accepting multicasts requests from the endpoint.

10. An endpoint in a packet switched communications network to maintain a provisioned configuration, the communications network utilizing a signaling protocol between the endpoint and gatekeepers, the endpoint including a processor which is operable to:
    send, during gatekeeper discovery, a gatekeeper request to a first gatekeeper from the endpoint within the signaling protocol;
    receive, from the first gatekeeper, the identity of an assigned gatekeeper and the fact that the assigned gatekeeper is designated as the assigned gatekeeper to the endpoint via a dedicated assigned gatekeeper field in a communication utilizing the signaling protocol, wherein the assigned gatekeeper is a second gatekeeper different from the first gatekeeper;

receive the addresses of the assigned gatekeeper and a plurality of alternate gatekeepers to the endpoint within the signaling protocol, the alternate gatekeepers being prioritized and being different from the first and second gatekeepers;

set the assigned gatekeeper as a default gatekeeper;

in response to an assigned gatekeeper being unresponsive:
   select an alternate gatekeeper based on the relative priority of the plurality of alternate gatekeepers;
   send a communication from the endpoint to the selected alternate gatekeeper;
   if the selected alternate gatekeeper is responsive, register with the selected alternate gatekeeper; and
   periodically send from the endpoint a polling status request to the assigned gatekeeper until the endpoint receives a confirmation message from the assigned gatekeeper, thereby to monitor when the assigned gatekeeper is once again responsive; and selectively re-register with the assigned gatekeeper in response to the assigned gatekeeper being once again responsive, wherein the assigned gatekeeper is a reconfigurable default gatekeeper for the endpoint.

11. The endpoint of claim 10, wherein the processor's operability to selectively re-register with the assigned gatekeeper in response to the assigned gatekeeper being once again responsive comprises the processor being operable to:
   terminate communication between the endpoint and the selected alternate gatekeeper; and
   resume communication between the endpoint and the assigned gatekeeper.

12. The endpoint of claim 10, wherein the processor is operable to monitor when the assigned gatekeeper is once again responsive while the endpoint is still registered with alternate gatekeeper.

13. A non-transitory machine-readable medium embodying instructions to provide gatekeepers in a packet switched communications network to maintain a provisioned configuration, the communications network utilizing a signaling protocol between the endpoint and a gatekeeper, the instructions when executed by a machine cause the machine to:

send, during gatekeeper discovery, a gatekeeper request to a first gatekeeper from the endpoint within the signaling protocol;

receive, from the first gatekeeper, the identity of an assigned gatekeeper and the fact that the assigned gatekeeper is designated as the assigned gatekeeper to the endpoint via a dedicated assigned gatekeeper field in a communication utilizing the signaling protocol, wherein the assigned gatekeeper is a second gatekeeper different from the first gatekeeper;

receive the addresses of the assigned gatekeeper and a plurality of alternate gatekeepers to the endpoint within the signaling protocol, the alternate gatekeepers being prioritized and being different from the first and second gatekeepers;

set the assigned gatekeeper as a default gatekeeper;

in response to an assigned gatekeeper being unresponsive:
   select an alternate gatekeeper based on the relative priority of the plurality of alternate gatekeepers;
   send a communication from the endpoint to the selected alternate gatekeeper;
   if the selected alternate gatekeeper is responsive, register with the selected alternate gatekeeper; and
   periodically send from the endpoint a polling status request to the assigned gatekeeper until the endpoint receives a confirmation message from the assigned gatekeeper, thereby to monitor when the assigned gatekeeper is once again responsive; and selectively re-register with the assigned gatekeeper in response to the assigned gatekeeper being once again responsive, wherein the assigned gatekeeper is a reconfigurable default gatekeeper for the endpoint.

\* \* \* \* \*